United States Patent
Shibamoto

(10) Patent No.: US 12,304,246 B2
(45) Date of Patent: May 20, 2025

(54) MOTORCYCLE TIRE

(71) Applicant: Sumitomo Rubber Industries, Ltd., Kobe (JP)

(72) Inventor: Shohei Shibamoto, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 18/379,544

(22) Filed: Oct. 12, 2023

(65) Prior Publication Data

US 2024/0157732 A1     May 16, 2024

(30) Foreign Application Priority Data

Nov. 10, 2022    (JP) ................... 2022-180574

(51) Int. Cl.
    *B60C 11/00*      (2006.01)

(52) U.S. Cl.
     CPC ........ *B60C 11/0008* (2013.01); *B60C 11/005* (2013.01); *B60C 2011/0025* (2013.01); *B60C 2011/0033* (2013.01); *B60C 2200/10* (2013.01)

(58) Field of Classification Search
     CPC .............. B60C 11/0041; B60C 11/005; B60C 11/0058; B60C 11/0066; B60C 11/0075
     See application file for complete search history.

(56) References Cited

U.S. PATENT DOCUMENTS

| | | | |
|---|---|---|---|
| 2012/0132332 A1* | 5/2012 | Zhao ................. | B60C 11/00 152/209.5 |
| 2019/0263183 A1* | 8/2019 | Kono ................. | B60C 11/033 |

FOREIGN PATENT DOCUMENTS

| | | | | |
|---|---|---|---|---|
| EP | 2 452 834 A2 | 5/2012 | | |
| EP | 2 452 834 A3 | 6/2014 | | |
| EP | 3689640 A1 | * | 8/2020 | |
| EP | 3 950 387 A1 | 2/2022 | | |
| JP | 02147410 A | * | 6/1990 | ........... B60C 11/005 |
| JP | 10181311 A | * | 7/1998 | ........... B60C 11/005 |
| JP | 2002059709 A | * | 2/2002 | ........... B60C 11/005 |
| JP | 2014-162367 A | | 9/2014 | |
| JP | 2014172588 A | * | 9/2014 | |
| WO | WO 2021/224874 A1 | 11/2021 | | |

OTHER PUBLICATIONS

Machine Translation: JP-2002059709-A, Kuwabara T, (Year: 2024).*
Machine Translation: JP-2014172588-A, Kobayashi H, (Year: 2024).*
Machine Translation: JP-02147410-A, Kadota A, (Year: 2024).*
Machine Translation: JP-10181311-A, Funahara K, (Year: 2024).*
Extended European Search Report for European Application No. 23206869.2, dated May 21, 2024.

* cited by examiner

*Primary Examiner* — Kendra Ly
(74) *Attorney, Agent, or Firm* — Birch, Stewart, Kolasch & Birch, LLP

(57) ABSTRACT

A motorcycle tire includes a tread portion between a pair of tread edges. The tread portion includes a tread rubber forming a tread surface. The tread rubber includes a first rubber layer comprising a first rubber and forming the tread surface, and a second rubber layer comprising a second rubber and being adjacent inwardly in a tire radial direction of the first rubber layer. A loss tangent $\tan \delta a$ of the first rubber at 100 degrees C. is smaller than a loss tangent $\tan \delta b$ of the second rubber at 100 degrees C. A glass transition temperature of the first rubber is lower than a glass transition temperature of the second rubber.

19 Claims, 2 Drawing Sheets

MOTORCYCLE TIRE

RELATED APPLICATIONS

This application claims the benefit of foreign priority to Japanese Patent Application No. JP2022-180574, filed Nov. 10, 2022, which is incorporated by reference in its entirety.

FIELD OF THE DISCLOSURE

The present disclosure is related to a motorcycle tire.

BACKGROUND OF THE DISCLOSURE

Patent document 1 below discloses a motorcycle tire which comprises a tread center region and tread shoulder regions located outwardly in the tire axial direction of the tread center region. Each tread shoulder region has a lower layer, an upper layer, and a middle layer, and the three layers are composed of rubbers. The loss tangent of these rubbers is set to be the upper layer being smaller than the middle layer, and the lower layer being smaller than the middle layer.

PATENT DOCUMENT

[Patent document 1] Japanese Unexamined Patent Application Publication 2014-162367

SUMMARY OF THE DISCLOSURE

In recent years, as the performance of motorcycles has increased, it has become desirable for motorcycle tires, especially for racing motorcycle tires, to have both grip performance and wear appearance performance. The smaller the abrasion (wispy wear) on the tire, the better the wear appearance performance. Excessive abrasion reduces the grip performance.

The present disclosure has been made in view of the above circumstances and has a major object to provide a motorcycle tire capable of improving grip performance and wear appearance performance.

In one aspect of the present disclosure, a motorcycle tire includes a tread portion between a pair of tread edges, wherein the tread portion includes a tread rubber forming a tread surface, the tread rubber includes a first rubber layer comprising a first rubber and forming the tread surface, and a second rubber layer comprising a second rubber and being adjacent inwardly in a tire radial direction of the first rubber layer, a loss tangent tan $\delta a$ of the first rubber at 100 degrees C. is smaller than a loss tangent tan $\delta b$ of the second rubber at 100 degrees C., and a glass transition temperature of the first rubber is lower than a glass transition temperature of the second rubber.

DETAILED DESCRIPTION OF THE DISCLOSURE

Hereinafter, one or more embodiments of the present disclosure will be described in detail based on the drawings.

Figure 1:
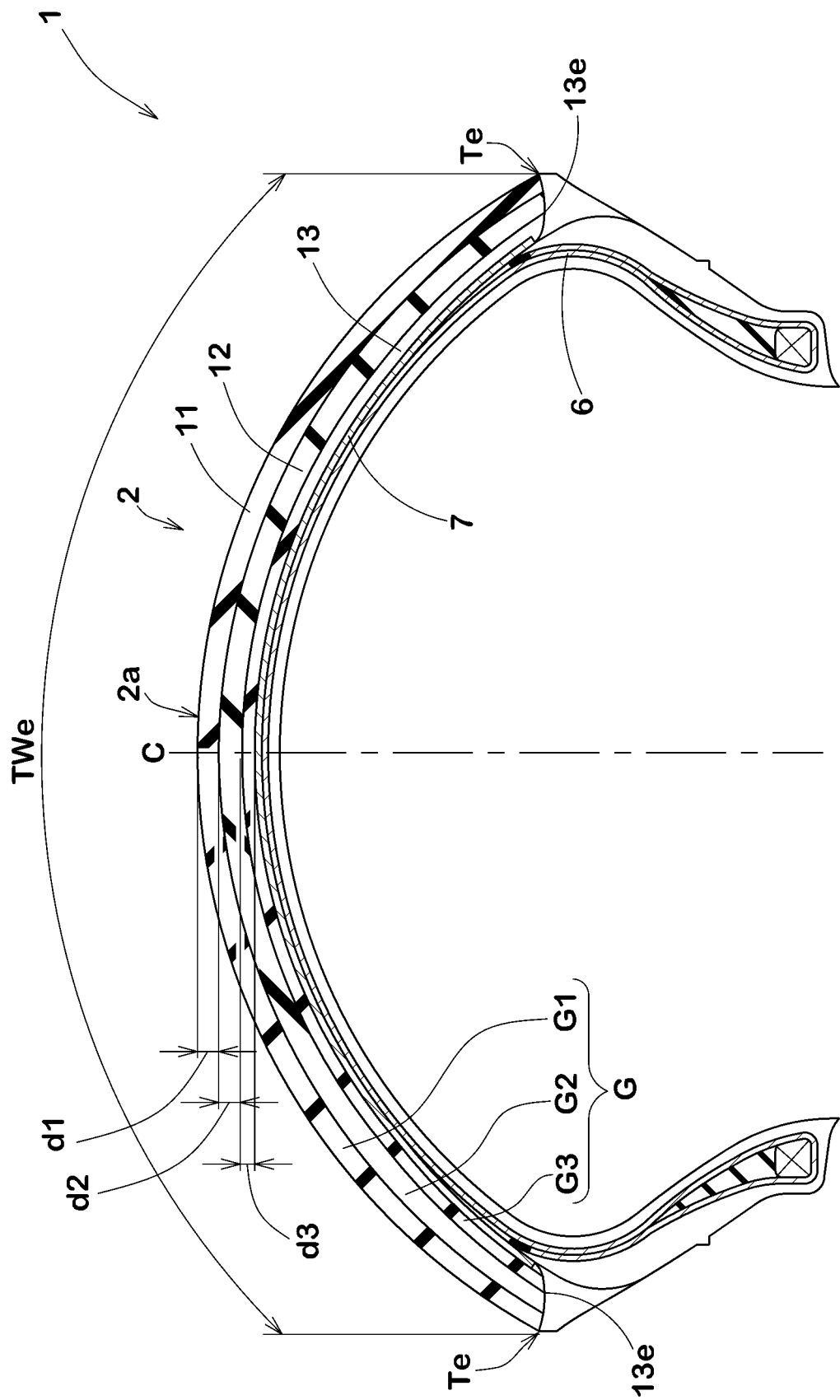
FIG. 1 is a meridian cross-sectional view of a motorcycle tire according to an embodiment of the present disclosure.

FIG. 1 is a meridian cross-sectional view of a motorcycle tire (hereinafter referred to simply as "tire") 1 according to an embodiment of the present disclosure. The cross-sectional view is a cross-section of the tire 1 including the rotation axis (not illustrated) under its normal state. The tire 1 according to the present disclosure is suitable, for example, for racing on a circuit. Such a tire 1 may be designed to have a smaller driving range than ordinary tires. However, the tire 1 of the present disclosure is not limited to such racing tires.

As used herein, the "normal state" is such that the tire 1 is mounted onto a standard wheel rim (not illustrated) with a standard pressure but loaded with no tire load. As used herein, unless otherwise noted, dimensions of portions of the tire are values measured under the normal state.

As used herein, the "standard wheel rim" is a wheel rim officially approved for each tire by the standard organization on which the tire is based, wherein the standard wheel rim is the "standard rim" specified in JATMA, the "Design Rim" in TRA, and the "Measuring Rim" in ETRTO, for example.

As used herein, the "standard pressure" is a standard pressure officially approved for each tire by the standard organization on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

As illustrated in FIG. 1, the tire 1 according to the present embodiment includes a tread portion 2 between a pair of tread edges Te and Te. For example, the tread surface 2a, which is the outer surface of the tread portion 2, extends between the pair of tread edges Te in a curved manner that protrudes outwardly in the tire radial direction. Such a tire 1 can turn with large camber angles.

As used herein, the tread edges Te are the outer edges in the tire axial direction of the tread surface 2a that come into contact with the ground when the camber angle is maximized. The length measured along the tread surface 2a between the tread edges Te, Te is the tread development width TWe. The axial center between the two tread ends Te and Te is the tire equator C.

The tread portion 2 includes a tread rubber G forming the tread surface 2a. The tread rubber G includes a first rubber layer 11 made of a first rubber G1 and forming the tread surface 2a, and a second rubber layer 12 made of a second rubber G2 and being adjacent inwardly in the tire radial direction of the first rubber layer 11.

A loss tangent tan $\delta a$ of the first rubber G1 at 100 degrees C. is smaller than a loss tangent tan $\delta b$ of the second rubber G2 at 100 degrees C. Thus, the second rubber G2 has large hysteresis loss and basic grip performance. In addition, the first rubber G1 has a smaller heat generation rate and thus can reduce the wear. If the loss tangent tan $\delta a$ is excessively smaller than the loss tangent tan $\delta b$, the grip of the first rubber G1 which comes into contact with the ground may deteriorate excessively. Accordingly, the difference (tan $\delta b$−tan $\delta a$) between the loss tangent tan $\delta b$ and the loss tangent tan $\delta a$ is preferably equal to or more than 0.02, more preferably equal to or more than 0.04, but preferably equal to or less than 0.1, more preferably equal to or less than 0.08. In addition, the loss tangent tan $\delta a$ is preferably equal to or more than 0.15, more preferably equal to or more than 0.20, but preferably equal to or less than 0.35, more preferably equal to or less than 0.30.

As used herein, a loss tangent tan $\delta$ and the complex elastic modulus E* of rubber are the values measured by a viscoelasticity spectrometer under the conditions shown below, in accordance with JISK6394 "Vulcanized and thermoplastic rubbers—Determination of dynamic properties—General guidelines".

Initial distortion: plus/minus 10%
Amplitude: plus/minus 2%
Frequency: 10 Hz
Deformation mode: tensile
Temperature: 100 degrees C.
Viscoelasticity spectrometer: GABO's Iplexar (registered trademark)

A glass transition temperature Tga of the first rubber G1 is lower than a glass transition temperature Tgb of the second rubber G2. This can keep the first rubber layer 11, which is in direct contact with the ground, soft and thus provides high grip performance when the tire temperature is relatively low, such as in the early stage of driving. Therefore, the motorcycle tires of the present disclosure can exhibit even better grip performance. If the glass transition temperature Tga is excessively smaller than the glass transition temperature Tgb, wear (abrasion, etc.) may occur earlier in the first rubber G1, and the wear appearance performance may deteriorate. From this point of view, the difference (Tgb−Tga) between the glass transition temperature Tgb and the glass transition temperature Tga is preferably equal to or more than 3 degrees C., more preferably equal to or more than 7 degrees C., but preferably equal to or less than 30 degrees C., more preferably equal to or less than 20 degrees C. In addition, the glass transition temperature Tga of the first rubber G1 is preferably equal to or more than −10 degrees C., more preferably equal to or more than 5 degrees C., but preferably equal to or less than 30 degrees C., more preferably equal to or less than 20 degrees C. Thus, the tire 1 according to the present embodiment can improve both grip performance and wear appearance performance.

As used herein, the glass transition temperature of rubber was measured with a differential scanning calorimeter (Q200) manufactured by T.A. Instruments Japan, Inc. at a temperature increase rate of 10 degrees C./min in accordance with JIS-K7121.

In the present embodiment, the tread portion 2 includes a carcass 6 and a belt layer 7 adjacent to the carcass 6 outwardly in the tire radial direction. The belt layer 7 is adjacent to the tread rubber G inwardly in the radial direction of the tire. In the present embodiment, carcass 6 and belt layer 7 are conventionally structured.

The tread rubber G further includes a third rubber layer 13 made of a third rubber G3 disposed inwardly of the second rubber layer 12 in the tire radial direction. The third rubber layer 13, in the present embodiment, is located innermost side of the tread rubber G in the tire radial direction. The third rubber layer 13, for example, is adjacent to the belt layer 7 in the tire radial direction. The tread rubber G, for example, may include a fourth rubber layer (not illustrated) disposed inwardly of the third rubber layer 13 in the tire radial direction.

Preferably, a 300% modulus M300a of the first rubber G1 is greater than a 300% modulus M300b of the second rubber G2. The first rubber layer 11 forms the tread surface 2a. Thus, such a first rubber G1 can reduce abrasion on the tread surface 2a and can maintain a large ground contact area, which further enhances the grip performance. If the 300% modulus M300a is excessively larger than the 300% modulus M300b, the grip performance may deteriorate. Thus, the difference (M300a−M300b) between the 300% modulus M300a and the 300% modulus M300b is preferably equal to or more than 1.0 MPa, more preferably equal to or more than 1.5 MPa, but preferably equal to or less than 6.0 MPa, more preferably equal to or less than 5.5 MPa. The 300% modulus M300a is preferably equal to or more than 3.0 MPa, more preferably equal to or more than 4.0 MPa, but preferably equal to or less than 7.0 MPa, more preferably equal to or less than 6.0 MPa. As used herein, a 300% modulus of rubber is the modulus at 300% elongation, measured at 30 degrees C. in accordance with JISK6251 "Vulcanized rubbers and thermoplastic rubbers—Determination of tensile properties". The rubber with relatively large loss tangent tan δ at 100 degrees C. tends to have relatively small 300% modulus M300, and the rubber with relatively small loss tangent tan δ at 100 degrees C. tends to have relatively large 300% modulus M300.

A complex elastic modulus E*a of the first rubber G1 is greater than a complex elastic modulus E*b of the second rubber G2. Such a first rubber G1 can reduce the deterioration of the tread surface 2a and can improve the grip performance and handling performance. If the complex elastic modulus E*a is excessively larger than the complex elastic modulus E*b, the second rubber G2 may be easily deformed, and the grip performance may be deteriorated instead. From this point of view, the difference (E*a−E*b) between the complex elastic modulus E*a and the complex elastic modulus E*b is preferably equal to or more than 0.1 MPa, more preferably equal to or more than 0.2 MPa, but preferably equal to or less than 1.0 MPa, more preferably equal to or less than 0.8 MPa. Furthermore, the complex elastic modulus E*a of the first rubber G1 is preferably equal to or more than 1.0 MPa, more preferably equal to or more than 1.5 MPa, but preferably equal to or less than 3.0 MPa, more preferably equal to or less than 2.5 MPa.

The second rubber layer 12 made of the second rubber G2, for example, is required to improve the grip performance from the beginning to the end of driving. On the other hand, the first rubber layer 11 made of the first rubber G1, for example, is required to improve wear appearance performance by reducing abrasion, while improving grip performance in relatively low tire temperature conditions such as in the early stage of driving. For this reason, the thickness d2 of the second rubber layer 12 is preferably equal to or greater than the thickness d1 of the first rubber layer 11.

In the present embodiment, the thickness d1 of the first rubber layer 11 is the same as the thickness d2 of the second rubber layer 12. Such a tire 1 can suppress abrasion for a relatively long period of time, making it suitable, for example, for the tire 1 for the final races with larger mileage than the qualifying race. The above-mentioned "same" means that the difference (d1−d2) between the thickness d1 of the first rubber layer 11 and the thickness d2 of the second rubber layer 12 is not only 0 mm but also less than 1.0 mm. In the present embodiment, the thickness d1 of the first rubber layer 11 and the thickness d2 of the second rubber layer 12 are preferably equal to or more than 2.0 mm, more preferably equal to or more than 2.5 mm, but preferably equal to or less than 5.0 mm, more preferably equal to or less than 4.5 mm.

An amount AEc of oil contained in the third rubber G3 is smaller than an amount AEb of oil contained in the second rubber G2. This can prevent the oil of the third rubber G3 from migrating to the belt layer 7, and the oil of the second rubber G2 is stopped by the third rubber G3, thus preventing damage to the belt cords (not shown) in the belt layer 7. As a result, the grip performance can be maintained at a high level. Although not particularly limited, the amount AEc of oil of the third rubber G3 is preferably equal to or more than 0.15 times the amount AEb of oil of the second rubber G2, more preferably equal to or more than 0.2 times, but preferably equal to or less than 0.45 times, more preferably equal to or less than 0.40 times. As used herein, the oil content (%) is the percentage of the mass of oil contained in the rubber composition to the mass of the rubber composition.

The loss tangent tan δc of the third rubber G3 at 100 degrees C. is preferably equal to or more than 0.05, more preferably equal to or more than 0.07, but preferably equal to or less than 0.20, more preferably equal to or less than 0.25. In addition, the glass transition temperature Tgc of the third rubber G3 is preferably equal to or higher than −20 degrees C., more preferably equal to or higher than −15 degrees C., but preferably equal to or lower than 5 degrees C., more preferably equal to or lower than 0 degrees C. Further, the 300% modulus M300c of the third rubber G3 is preferably equal to or more than 2.0 MPa, more preferably equal to or more than 2.5 MPa, but preferably equal to or less than 4.0 MPa, more preferably equal to or less than 3.5 MPa. Furthermore, the complex elastic modulus E*c of the third rubber G3 is preferably equal to or more than 1.0 MPa, more preferably equal to or more than 1.5 MPa, but preferably equal to or less than 3.0 MPa, more preferably equal to or less than 2.5 MPa. For example, a thickness d3 of the third rubber layer 13 is preferably equal to or more than 0.3 mm, more preferably equal to or more than 0.5 mm, but preferably equal to or less than 1.0 mm, more preferably equal to or less than 0.8 mm. The first rubber G1, the second rubber G2 and the third rubber G3 can be produced by using known rubber materials.

For example, the first rubber layer 11, the second rubber layer 12 and the third rubber layer 13 extend in the tire axial direction centered at the tire equator C. In the present embodiment, the first rubber layer 11, the second rubber layer 12 and the third rubber layer 13 each have a developed length along the tread surface 2a that is at least 80% of the tread developed width TWe. This enables the above-mentioned effects to be achieved in both straight running and turning. The developed length of each lubber layer is preferably equal to or more than 90% of the tread developed width TWe, more preferably equal to or more than 95%. In the present embodiment, the first rubber layer 11 extends from one of the tread edge Te to the other one of the tread edge Te. For example, the third rubber layer 13 has axially outer edges 13e which are located outwardly in the tire axial direction of the belt layer 7.

Figure 2:
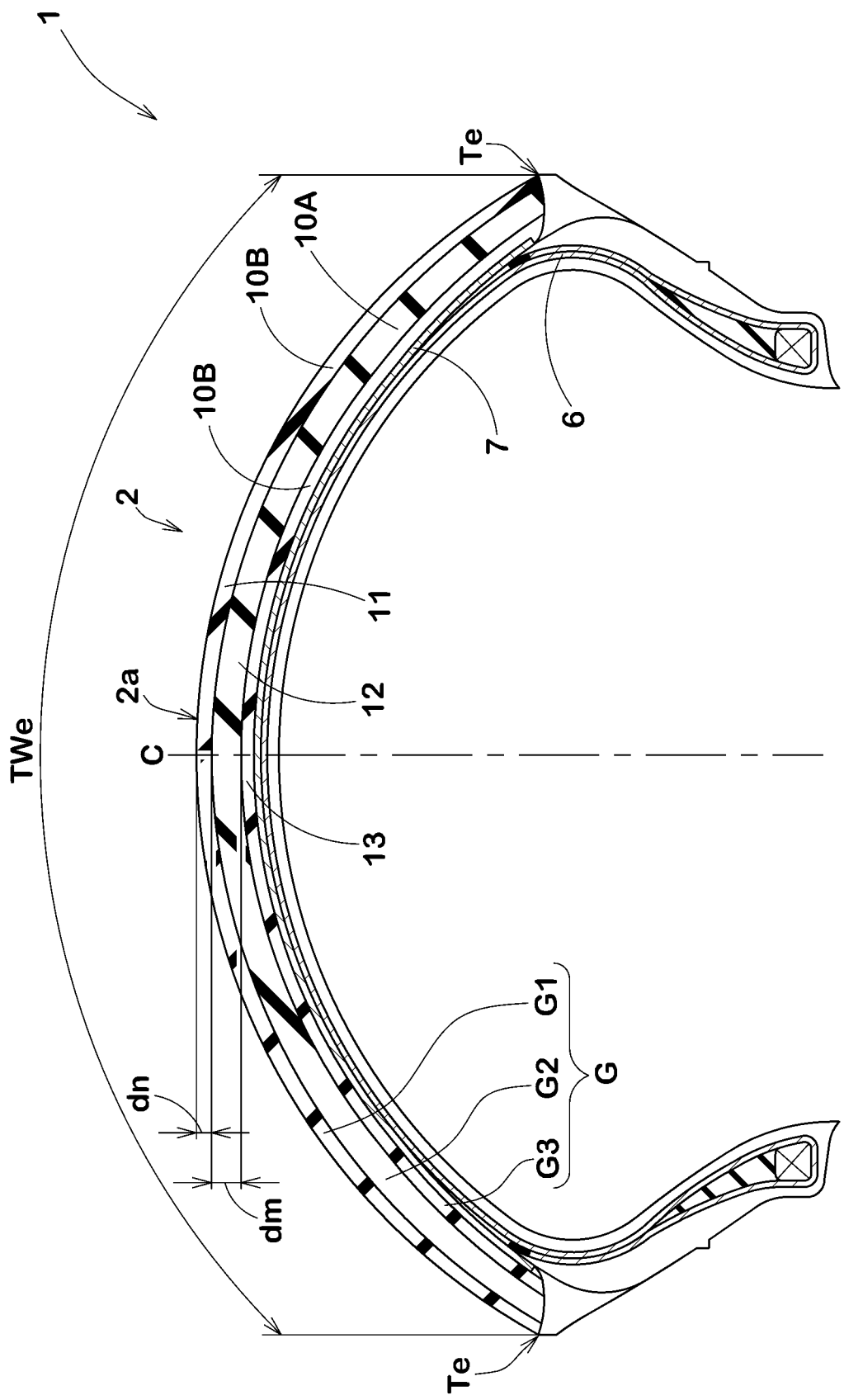
FIG. 2 is a meridian cross-sectional view of a motorcycle tire according to another embodiment of the present disclosure.

FIG. 2 is a meridian cross-sectional view of the tire 1 according to another embodiment. In this embodiment, the same elements as in the previous embodiment are denoted by the same reference signs and the description may be omitted. As illustrated in FIG. 2, in this embodiment, the tread rubber G includes a rubber layer 10A having the largest rubber thickness and a rubber layer 10B having the smallest rubber thickness.

In this embodiment, the rubber layer 10A with the largest rubber thickness is the second rubber layer 12. This makes the second rubber G2 more effective in improving the grip performance. If the thickness dm of the rubber layer 10A is excessively large, smooth turning may be difficult and handling performance may deteriorate. In addition, the mass of the tire 1 becomes large, making it unsuitable for racing. Thus, the thickness dm of the rubber layer 10A is preferably equal to or more than 3 mm, more preferably equal to or more than 4 mm, but preferably equal to or less than 8 mm, more preferably equal to or less than 7 mm.

In this embodiment, the rubber layer 10B with the minimum rubber thickness is the first rubber layer 11. Such a first rubber layer 11 is suitable for the tire 1 for qualifying races with relatively small mileage, because the abrasion suppression effect may be smaller. Although not particularly limited, considering the distance driving in the qualifying rounds of the race, the thickness do of the rubber layer 10B is preferably equal to or more than 0.3 mm, more preferably equal to or more than 0.5 mm, but preferably equal to or less than 1 mm, more preferably equal to or less than 0.8 mm. For example, the rubber layer 10B with the minimum rubber thickness may be the first rubber layer 11 and the third rubber layer 13.

Although particularly preferred embodiments of the present disclosure have been described in detail, the present disclosure is not limited to the above-described embodiments and may be embodied in various aspects.

Example

Some motorcycle tires with the basic structure shown in FIG. 1 were prototyped according to the specifications shown in Table 1. The test tires were mounted on the front and rear wheels of a motorcycle and driven by a test rider on a dry asphalt circuit. The test rider evaluated the grip performance and wear appearance performance by sensory evaluation. The wear appearance performance was evaluated by visual inspection of abrasion on the tread surface after driving. The results are given on a 10-point scale, where 10 is the maximum score, and the higher the score, the better the wear appearance performance. The main common items are as follows.

Common Items:
Front tire size: 120/70R17
Front wheel air pressure: 240 kPa
Rear tire size: 200/60R17
Rear wheel air pressure: 160 kPa
Motorcycle displacement: 1000 cc
Table 1 shows the test results.

TABLE 1

|  | Comparative example 1 | Ex. 1 | Ex. 2 | Ex. 3 | Ex. 4 | Ex. 5 | Ex. 6 |
| --- | --- | --- | --- | --- | --- | --- | --- |
| tan δa | 0.35 | 0.25 | 0.25 | 0.25 | 0.25 | 0.2 | 0.2 |
| tan δb | 0.20 | 0.30 | 0.30 | 0.30 | 0.33 | 0.35 | 0.35 |
| tan δc | 0.10 | 0.10 | 0.10 | 0.10 | 0.10 | 0.10 | 0.10 |
| Tga (degrees C.) | 5 | 5 | 5 | 5 | 5 | 5 | 5 |
| Tgb (degrees C.) | 15 | 15 | 15 | 15 | 15 | 15 | 15 |
| Tgc (degrees C.) | 0 | 0 | 0 | 0 | 0 | 0 | 0 |
| M300a (MPa) | 1.5 | 5.0 | 5.0 | 5.0 | 5.0 | 6.0 | 6.0 |
| M300b (MPa) | 6.0 | 3.0 | 3.0 | 3.0 | 2.0 | 1.5 | 1.5 |
| M300c (MPa) | 3.0 | 3.0 | 3.0 | 3.0 | 3.0 | 3.0 | 3.0 |
| E*a (MPa) | 2.0 | 2.0 | 2.0 | 1.0 | 2.0 | 2.0 | 2.0 |

TABLE 1-continued

|  | Comparative example 1 | Ex. 1 | Ex. 2 | Ex. 3 | Ex. 4 | Ex. 5 | Ex. 6 |
|---|---|---|---|---|---|---|---|
| E*b (MPa) | 1.5 | 1.5 | 1.5 | 2 | 1.5 | 1.5 | 1.5 |
| E*c (MPa) | 2.0 | 2.0 | 2.0 | 2.0 | 2.0 | 2.0 | 2.0 |
| d1 (mm) | 3.0 | 3.0 | 4.0 | 3.0 | 3.0 | 3.0 | 3.0 |
| d2 (mm) | 3.0 | 3.0 | 2.0 | 3.0 | 3.0 | 3.0 | 3.0 |
| d3 (mm) | 1.0 | 1.0 | 1.0 | 1.0 | 1.0 | 1.0 | 1.0 |
| Grip performance [score: Larger is better.] | 9 | 7 | 8 | 9 | 10 | 9 | 9 |
| Wear appearance performance [score: Larger is better.] | 2 | 5 | 5 | 5 | 5 | 7 | 7 |

As a result of the test, it was confirmed that the example tires exhibited superior grip performance and wear appearance performance compared to the comparative example tire. Note that the tires with the basic structure shown in FIG. 2 were also tested for grip performance, and it was confirmed that these tires have high grip performance and are suitable for driving in qualifying races, where the driving distance is smaller than that of the final race. The handling performance was also tested, and it was confirmed that the example tires were superior to those in the comparative example tire.

Additional Note

The present disclosure includes the following aspects.

[Disclosure 1]

A motorcycle tire comprising:
a tread portion between a pair of tread edges, wherein
the tread portion comprises a tread rubber forming a tread surface,
the tread rubber comprises
    a first rubber layer comprising a first rubber and forming the tread surface, and
    a second rubber layer comprising a second rubber and being adjacent inwardly in a tire radial direction of the first rubber layer,
a loss tangent tan δa of the first rubber at 100 degrees C. is smaller than a loss tangent tan δb of the second rubber at 100 degrees C., and
a glass transition temperature of the first rubber is lower than a glass transition temperature of the second rubber.

[Disclosure 2]

The motorcycle tire according to disclosure 1, wherein
a 300% modulus M300a of the first rubber is greater than a 300% modulus M300b of the second rubber.

[Disclosure 3]

The motorcycle tire according to disclosure 1 or 2, wherein
a complex elastic modulus E*a of the first rubber is greater than a complex elastic modulus E*b of the second rubber.

[Disclosure 4]

The motorcycle tire according to any one of disclosures 1 to 3, wherein
a thickness of the second rubber layer is equal to or greater than a thickness of the first rubber layer.

[Disclosure 5]

The motorcycle tire according to any one of disclosures 1 to 4, wherein
the tread rubber further comprises a third rubber layer comprising a third rubber located inwardly in the radial direction of the second rubber layer,
the third rubber layer is located at the most inner radial side of the tread rubber, and
an amount of oil contained in the third rubber is smaller than an amount of oil contained in the second rubber.

[Disclosure 6]

The motorcycle tire according to any one of disclosures 1 to 5, wherein
in the tread rubber, a thickness of the rubber layer with the maximum rubber thickness is 3 to 8 mm.

[Disclosure 7]

The motorcycle tire according to disclosure 6, wherein
the rubber layer with the maximum rubber thickness is the second rubber layer.

[Disclosure 8]

The motorcycle tire according to any one of disclosures 1 to 7, wherein
in the tread rubber, a thickness of the rubber layer with the minimum rubber thickness is 0.3 to 1 mm.

[Disclosure 9]

The motorcycle tire according to disclosure 8, wherein
the rubber layer with the minimum rubber thickness is the first rubber layer.

The invention claimed is:

1. A motorcycle tire comprising:
a tread portion between a pair of tread edges, wherein
the tread portion comprises a tread rubber forming a tread surface,
the tread rubber comprises
    a first rubber layer comprising a first rubber and forming the tread surface, and
    a second rubber layer comprising a second rubber and being adjacent inwardly in a tire radial direction of the first rubber layer,
the first rubber has a loss tangent tan δa at 100 degrees C. that is smaller than the second rubber loss tangent tan δb at 100 degrees C.,
the first rubber has a glass transition temperature Tga that is lower than the second rubber glass transition temperature Tgb and
the first rubber has a 300% modulus M300a that is greater than the second rubber 300% modulus M300b.

2. The motorcycle tire according to claim 1, wherein
the tread rubber further comprises a third rubber layer comprising a third rubber located inwardly in the radial direction of the second rubber layer,
the third rubber layer is located at the most inner radial side of the tread rubber, and
the third rubber layer contains an amount of oil that is smaller than an amount of oil contained in the second rubber.

3. The motorcycle tire according to claim 1, wherein in the tread rubber, a thickness of the rubber layer with the maximum rubber thickness is 3 to 8 mm.

4. The motorcycle tire according to claim 3, wherein the rubber layer with the maximum rubber thickness is the second rubber layer.

5. The motorcycle tire according to claim 1, wherein in the tread rubber, a thickness of the rubber layer with the minimum rubber thickness is 0.3 to 1 mm.

6. The motorcycle tire according to claim 5, wherein the rubber layer with the minimum rubber thickness is the first rubber layer.

7. The motorcycle tire according to claim 1, wherein the difference (Tgb−Tga) between the glass transition temperature Tgb and the glass transition temperature Tga is equal to or more than 3 degrees C.

8. The motorcycle tire according to claim 7, wherein the difference (Tgb−Tga) between the glass transition temperature Tgb and the glass transition temperature Tga is equal to or less than 30 degrees C.

9. The motorcycle tire according to claim 1, wherein the difference (M300a−M300b) between the 300% modulus M300a and the 300% modulus M300b is in a range from 1.0 to 6.0 MPa.

10. The motorcycle tire according to claim 9, wherein the 300% modulus M300a is in a range from 3.0 to 7.0 MPa.

11. The motorcycle tire according to claim 1, wherein the first rubber has a complex elastic modulus E*a that is greater than the second rubber complex elastic modulus E*b.

12. The motorcycle tire according to claim 11, wherein the second rubber has a thickness that is equal to or greater than the first rubber thickness.

13. The motorcycle tire according to claim 11, wherein the difference (E*a−E*b) between the complex elastic modulus E*a and the complex elastic modulus E*b is in a range from 0.1 to 1.0 MPa.

14. The motorcycle tire according to claim 1, wherein the difference (tan δb−tan δa) between the loss tangent tan δb and the loss tangent tan δa is equal to or more than 0.02.

15. The motorcycle tire according to claim 14, wherein the difference (tan δb−tan δa) between the loss tangent tan δb and the loss tangent tan δa is equal to or less than 0.1.

16. The motorcycle tire according to claim 15, wherein the loss tangent tan δa is in a range from 0.15 to 0.35.

17. The motorcycle tire according to claim 16, wherein the difference (Tgb−Tga) between the glass transition temperature Tgb and the glass transition temperature Tga is in a range from 3 to 30 degrees C.

18. A motorcycle tire comprising:
a tread portion between a pair of tread edges, wherein
the tread portion comprises a tread rubber forming a tread surface,
the tread rubber comprises
a first rubber layer comprising a first rubber and forming the tread surface and
a second rubber layer comprising a second rubber and being adjacent inwardly in a tire radial direction of the first rubber layer,
the first rubber has a loss tangent tan δa at 100 degrees C. that is smaller than the second rubber loss tangent tan δb at 100 degrees C.,
the first rubber has a glass transition temperature Tga that is lower than the second rubber glass transition temperature Tgb and
the loss tangent tan δa is in a range from 0.15 to 0.35.

19. A motorcycle tire comprising:
a tread portion between a pair of tread edges, wherein
the tread portion comprises a tread rubber forming a tread surface,
the tread rubber comprises
a first rubber layer comprising a first rubber and forming the tread surface and
a second rubber layer comprising a second rubber and being adjacent inwardly in a tire radial direction of the first rubber layer,
the first rubber has a loss tangent tan δa at 100 degrees C. that is smaller than the second rubber loss tangent tan δb at 100 degrees C.,
the first rubber has a glass transition temperature Tga that is lower than the second rubber glass transition temperature Tgb,
the difference (tan δb−tan δa) between the loss tangent tan δb and the loss tangent tan δa is equal to or more than 0.02 and equal to or less than 0.1,
the loss tangent tan δa is in a range from 0.15 to 0.35,
the difference (Tgb−Tga) between the glass transition temperature Tgb and the glass transition temperature Tga is in a range from 3 to 30 degrees C., and
the glass transition temperature Tga of the first rubber is in a range from −10 to 30 degrees C.

* * * * *